Aug. 23, 1938.    J. P. STOCKTON    2,127,622
BRIDGE PLAYING DEVICE
Filed Jan. 31, 1936    12 Sheets-Sheet 1
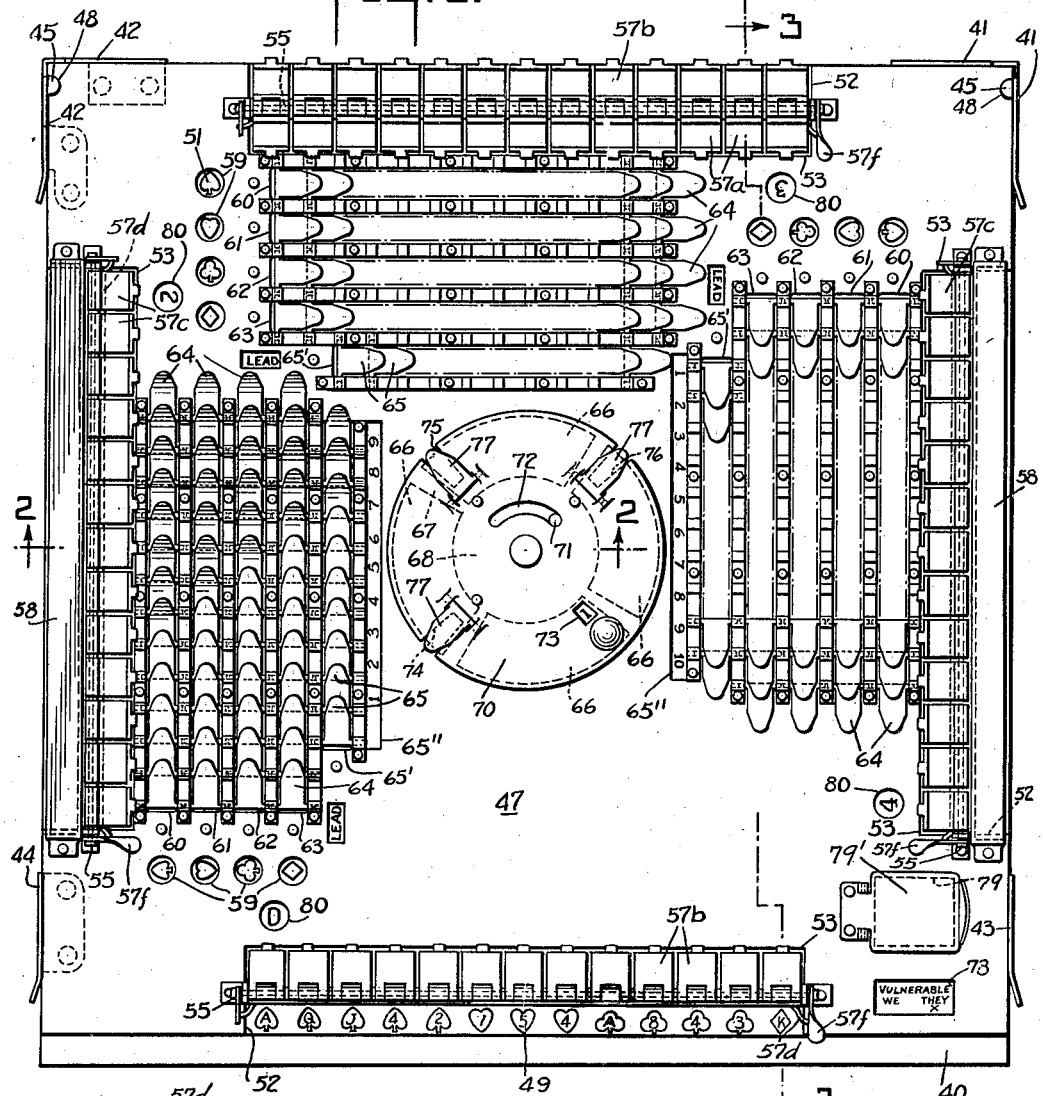
INVENTOR
J. Potter Stockton.
BY
Joel Liberman
ATTORNEY

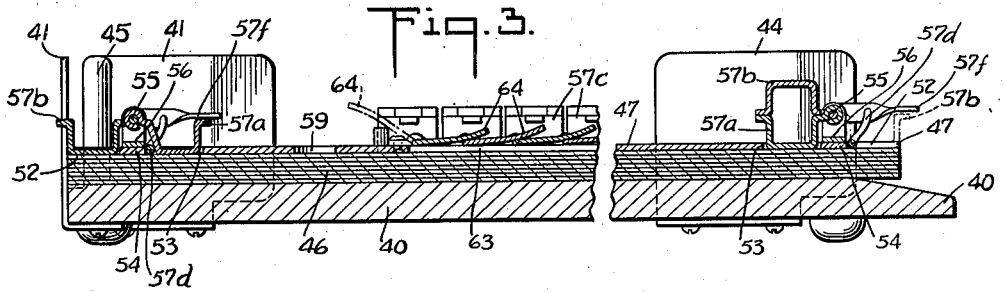
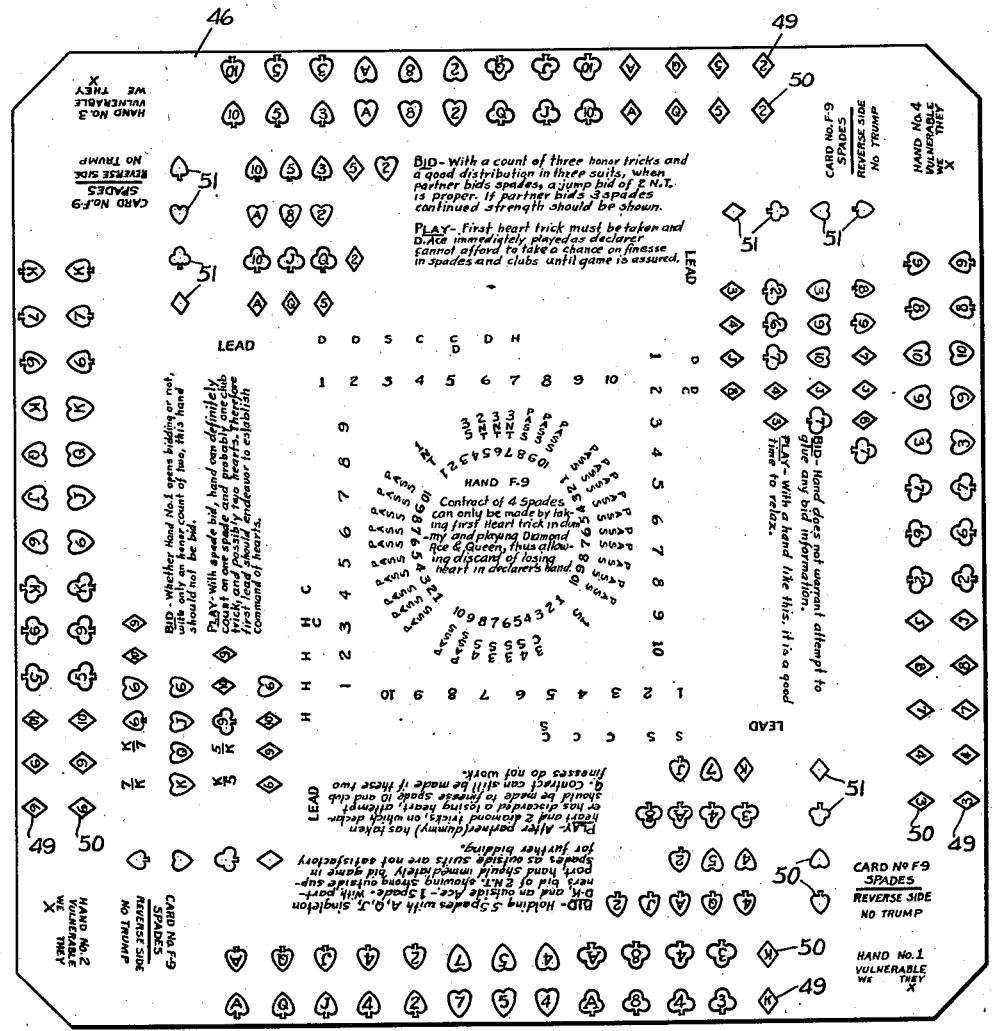

Aug. 23, 1938.   J. P. STOCKTON   2,127,622
BRIDGE PLAYING DEVICE
Filed Jan. 31, 1936   12 Sheets-Sheet 3

Responses of concealed hands

Setting for manual players secondary bid of 3 Clubs.

Manual Player bids 1 Spade

Response of manual player by a game bid of 4-Spades.

Setting of machine in event of initial pass by manual player #1 and bid of 1 diamond by manual player #2.

INVENTOR
J. Potter Stockton.
BY
ATTORNEY

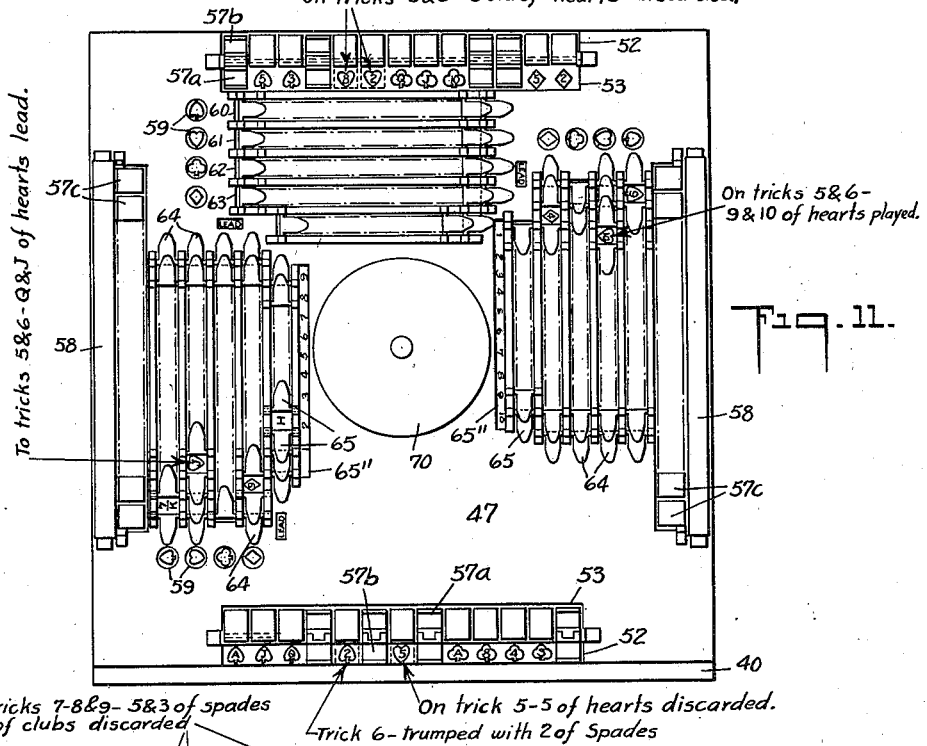
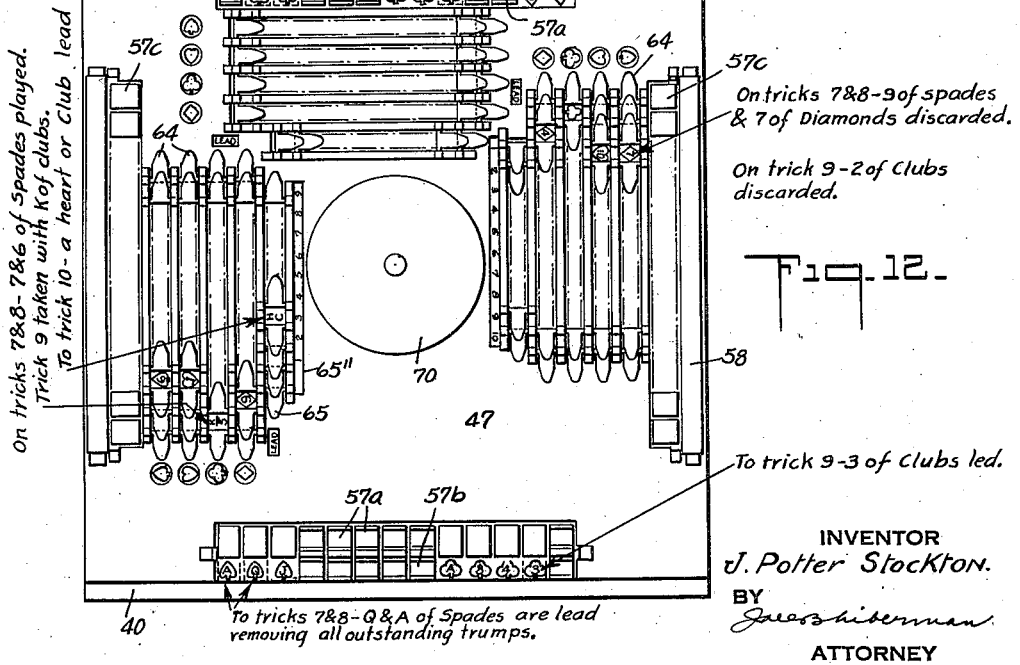

Aug. 23, 1938.    J. P. STOCKTON    2,127,622
BRIDGE PLAYING DEVICE
Filed Jan. 31, 1936    12 Sheets-Sheet 6
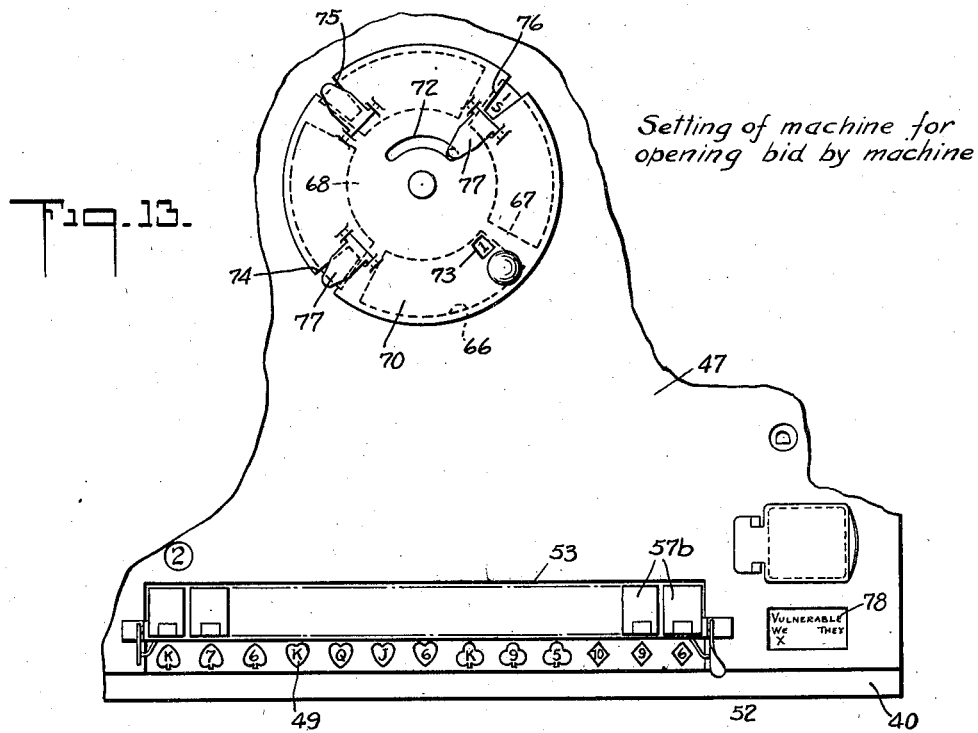
*Setting of machine for opening bid by machine*
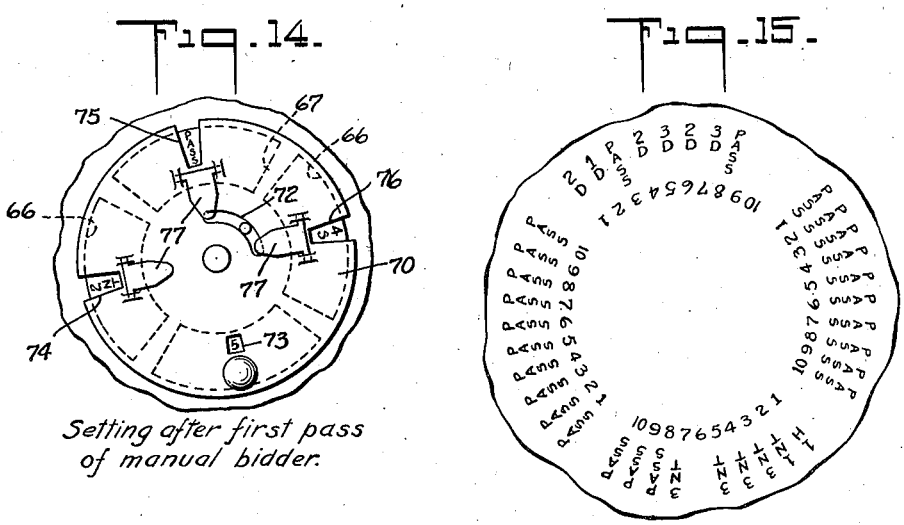
*Setting after first pass of manual bidder.*
INVENTOR
J. POTTER STOCKTON
BY
ATTORNEY

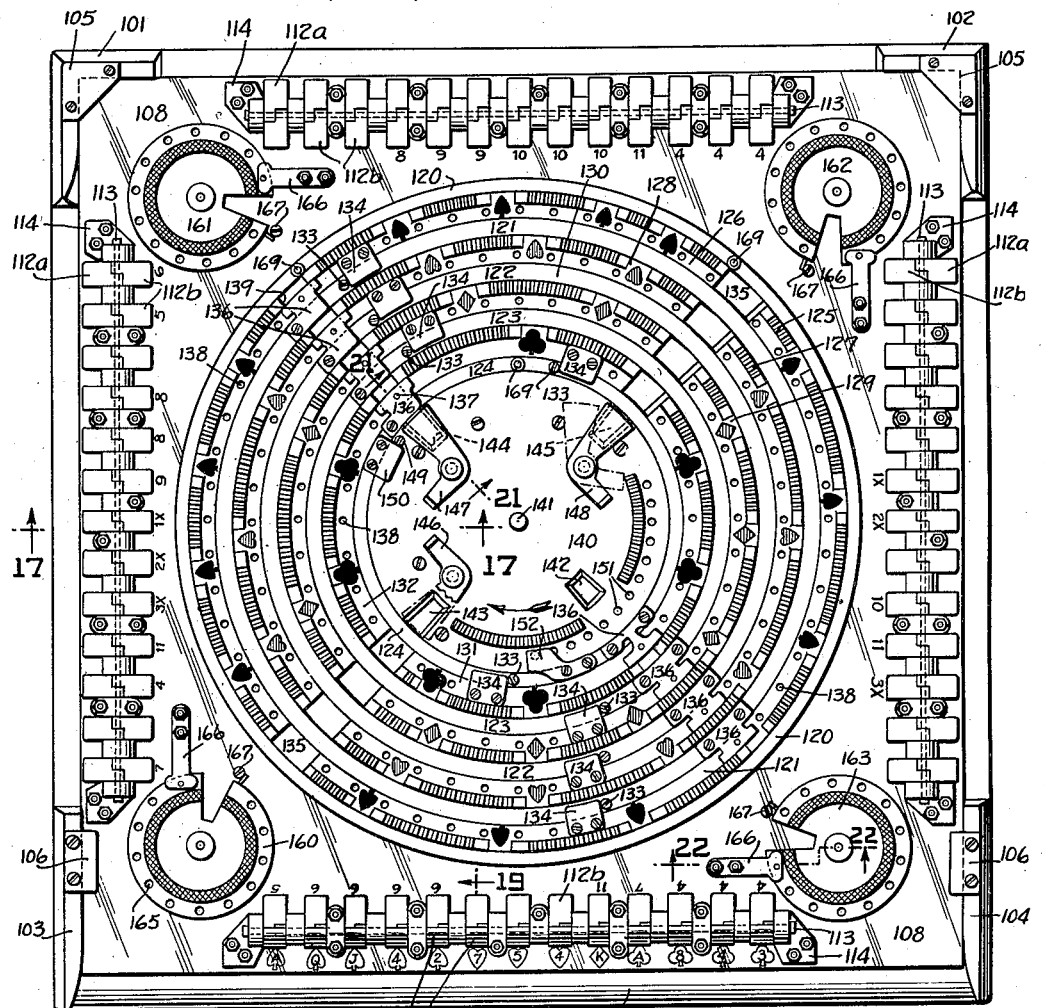

Aug. 23, 1938.  J. P. STOCKTON  2,127,622
BRIDGE PLAYING DEVICE
Filed Jan. 31, 1936  12 Sheets-Sheet 8

INVENTOR
J. Potter Stockton
BY
ATTORNEY

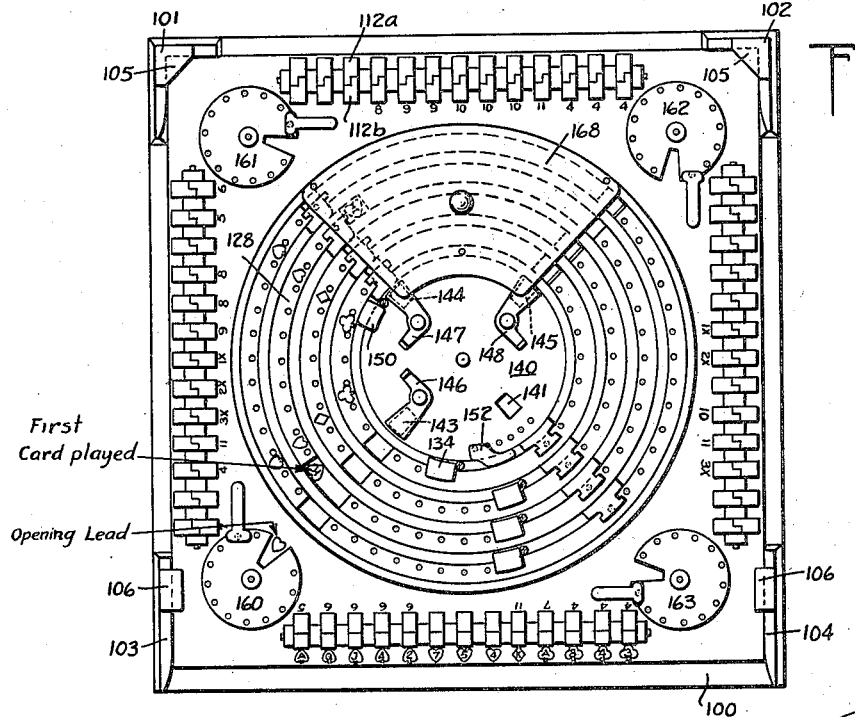

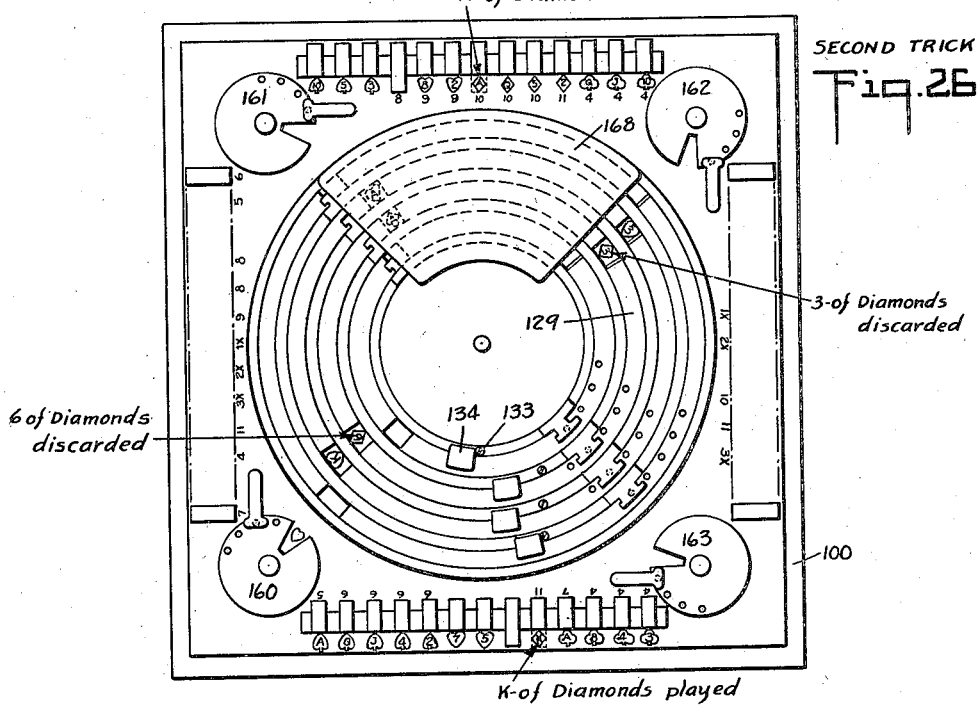
Fig. 26. SECOND TRICK
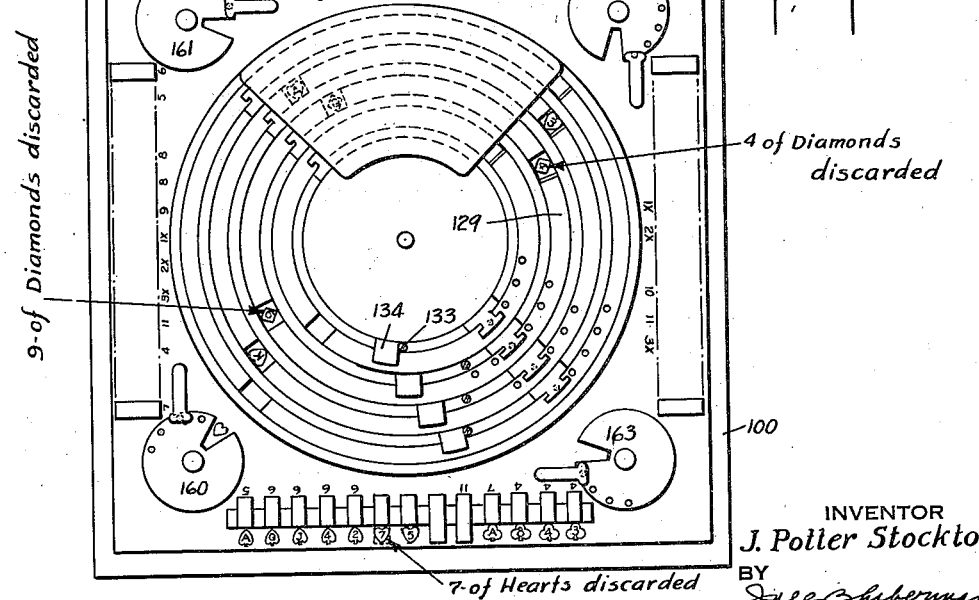
Fig. 27. THIRD TRICK

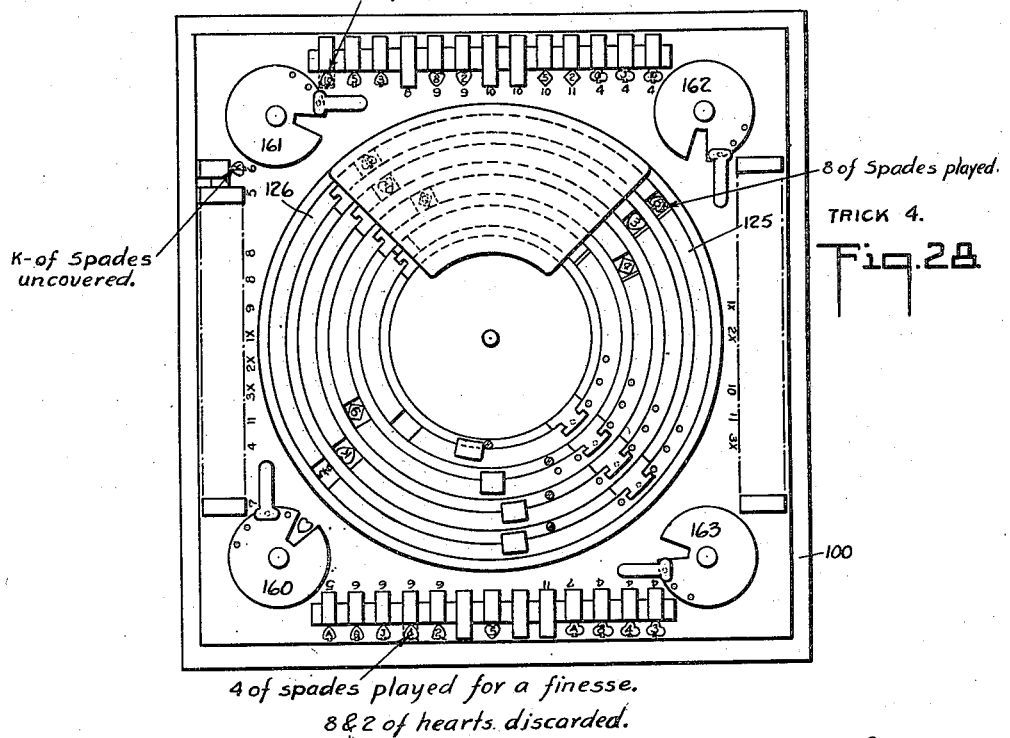

Aug. 23, 1938.  J. P. STOCKTON  2,127,622
BRIDGE PLAYING DEVICE
Filed Jan. 31, 1936  12 Sheets-Sheet 12

TRICKS 7-8&9

Fig.30.

5 & 3 of Spades & 10 of clubs discarded.

7 & 6 of Spades discarded.
Trick 9 taken with K of clubs.

9 of Spades
7 of Diamonds
& 2 of clubs
discarded.

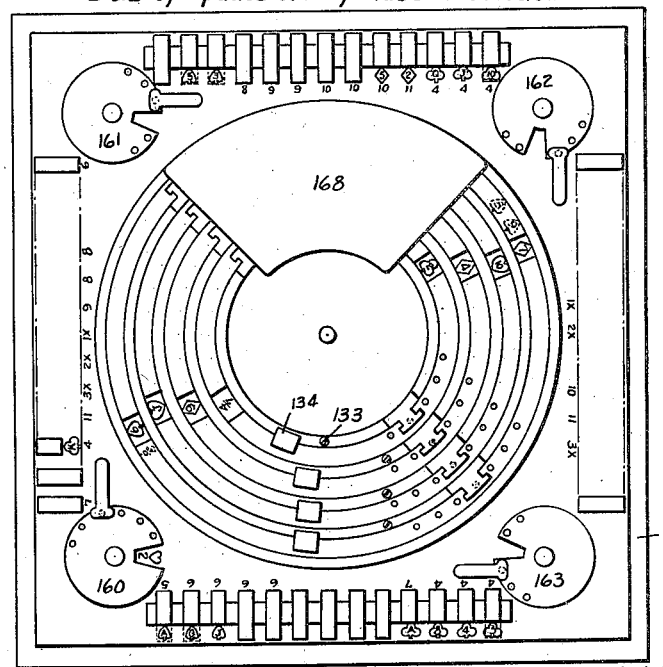

Q & A of spades are lead
removing all outstanding trumps.
Trick 10 taken with J of clubs. Q of clubs played.

To trick 9 - 3 of clubs lead.
5 of diamonds lead to trick 12.
5 of diamonds discarded
on trick 13.

Tricks 10-11-12-13

Fig.31.

To trick 10 - 5 of clubs lead.
On tricks 11-12&13 - 7 of clubs - 6 of hearts &
10 of diamonds discarded.

6 & 7 of clubs & 8 & J
of diamonds discarded.

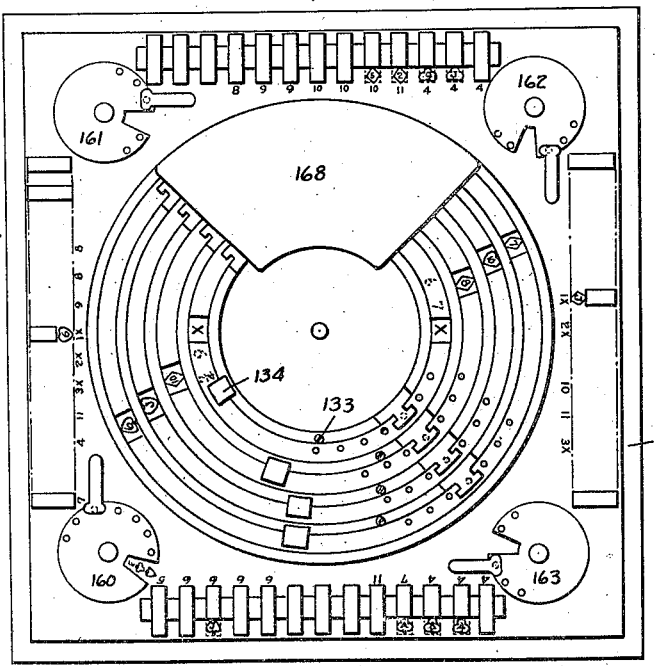

4 & 8 of clubs discarded on tricks 10 & 11.
Trick 12 trumped by J of spades and A of clubs lead.

INVENTOR
J. Potter Stockton
BY
Jules Luberman
ATTORNEY

Patented Aug. 23, 1938

2,127,622

UNITED STATES PATENT OFFICE 2,127,622

BRIDGE PLAYING DEVICE

Jack Potter Stockton, Spring Lake, N. J.

Application January 31, 1936, Serial No. 61,646

27 Claims. (Cl. 35—8)

The present invention relates to bridge playing devices adapted for the use of one person or a partnership, and is more particularly directed toward devices adapted for the bid and play of any of the hands of a bridge deal, either manually or by means of the machine.

According to the present invention, the cards of a bridge deal (either a random deal, or a preselected deal to illustrate a problem) are represented by suitable indications on a medium such as a sheet or card, and this medium also carries suitable lead indications and play indications for each of the four suits. The device is also provided with suitable movable means for concealing or revealing each of the card indications of each hand, as well as movable members which reveal in proper sequence the indications for each move, play or response from the non-manual hands for each successive trick. The indications for play in the manually playable hand or hands may be made by the concealing and revealing means.

In addition to the lead and play indications, the device also has means for carrying out the manual bidding of one hand or a partnership and the non-manual bidding of the other three (or two) hands. If desired, the device may be operated by a partnership of manual players and bidders opposite one another.

By means of the devices contemplated by the present invention, one player can, by aid of the machine, carry out all the steps of bid and play of the four hands of the bridge deal. In any case, any one of the four hands of the deal, or any two hands playing in partnership, may be manually played or played by the machine. That is to say, the machine may be declarer or defender.

According to the present invention, the indications for the cards, card play leads, bidding and other useful information in connection with the play of the bridge hand are carried on a medium such as a sheet or card adapted to be covered by a plate which carries the movable elements whereby the operations of mechanical and manual playing may be accomplished in the proper order the same as the hand would be bid and played as in the usual game of bridge.

The accompanying drawings illustrate two of the many possible embodiments in which the invention may take form.

In these drawings—

Fig. 1 is a top plan view of the bridge playing device illustrating the position for the parts of the manual bid and play of a disclosed hand;

Fig. 2 is a sectional view on the line 2—2 of Fig. 1 looking in the direction of the arrows;

Fig. 3 is a sectional view on the line 3—3 of Fig. 1 looking in the direction of the arrows, parts being broken away;

Fig. 4 is a view illustrating one face of the sheet or medium carrying the bridge hand, leads, discards, instructions, etc.;

Fig. 11 is a view similar to Fig. 9 illustrating the lead and play of tricks 5 and 6;

Fig. 12 is a view similar to Fig. 9 illustrating the lead and play of tricks 7, 8 and 9;

Fig. 13 is a view similar to Fig. 5 illustrating the setting of the bid device for ascertaining the opening bid of the machine where no manual bid precedes;

Fig. 14 shows the setting of the bid device after a pass by the manual bidder;

Fig. 15 illustrates the bid indications for a deal wherein a different problem in operating the bid device may be in control;

Fig. 16 is a top plan view showing a modified form of bridge playing device;

Fig. 17 is a sectional view taken on the line 17—17 of Fig. 16;

Figure 18:
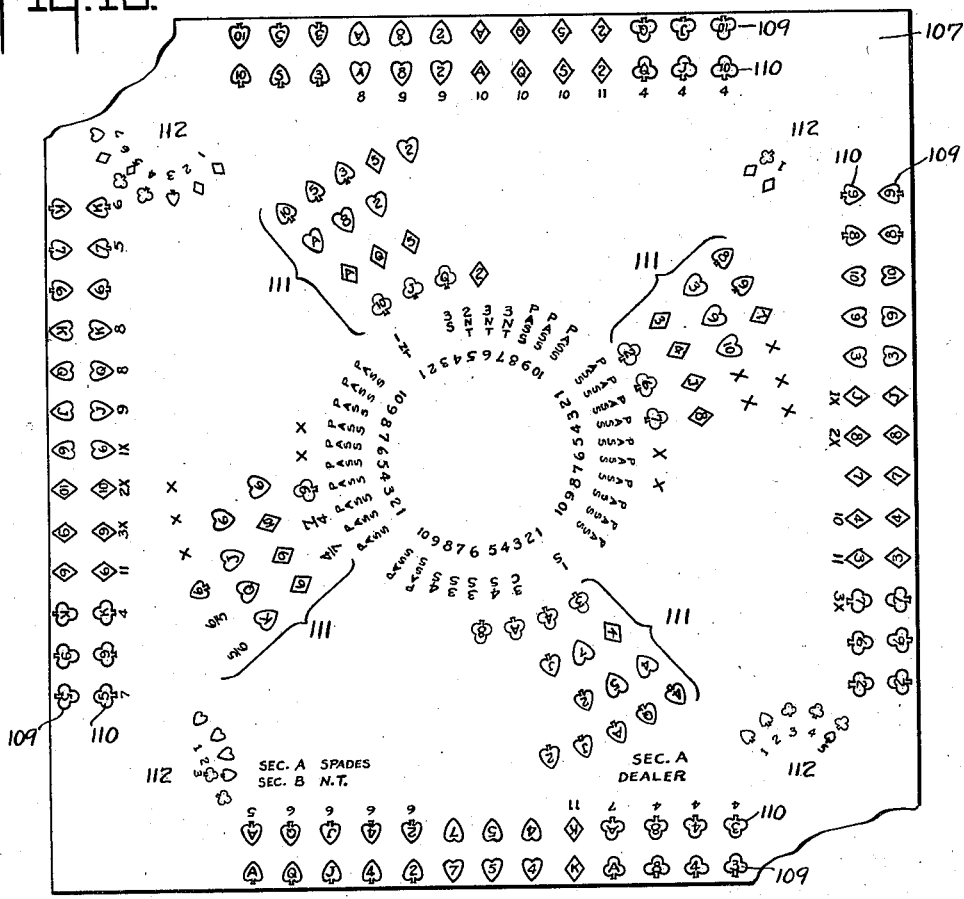
Fig. 18 is a top plan view of a sheet or medium bearing the card indications and lead and play indications; also bidding information for the hand shown, the card being arranged for use in a device such as shown in Fig. 16.
Figure 19:
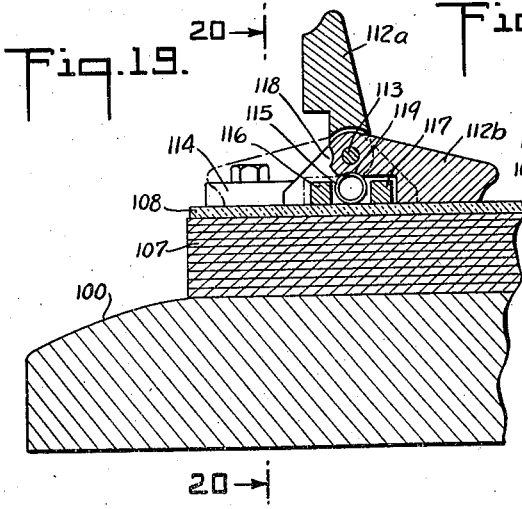
Fig. 19 is a fragmentary sectional view on an enlarged scale taken on the line 19—19 of Fig. 16.
Figure 20:
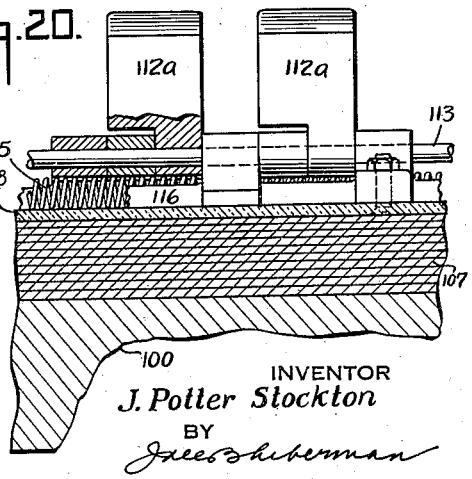
Fig. 20 is a sectional view taken on the line 20—20 of Fig. 19.

Figs. 21 and 22 are fragmentary sectional views taken on the lines 21—21 and 22—22 of Fig. 16;

Fig. 23 is a perspective view illustrating a cover plate adapted to cover the plays of the dummy hand; and Figs. 24 to 31 inclusive illustrate the positions assumed by the parts of the bridge playing device in playing off the hand illustrated, at a bid of four spades, using the card or sheet shown in Fig. 18.

In the form of construction shown in Figs. 1–15 inclusive, the bridge playing device has a rectangular base 40 which may be made of wood, and this base carries upwardly extending rear corner angles 41 and 42 and upwardly extending front and side members 43 and 44. The corner members 40 and 41 are provided with guides 45. The base is adapted to receive a plurality of cards 46. These cards are preferably square and are designed to be slid into the machine from the front or lowered in from the top.

A sheet metal cover plate 47 is made square and of the same size as the cards 46. This cover plate is notched as indicated at 48 to fit the aligning members 45 and keep the plate in proper position.

A typical card 46 for use in the machine is illustrated in Fig. 4. The corners of the card are cut away as indicated to facilitate inserting it in the machine. This card has been devised for playing the following deal:

```
                    S  10 5   3
                    H  A 8    2
                    D  A Q  5 2
                    C  Q J 10
                    (Hand No. 3)

S  K 7 6                          S  9 8
    H  K Q J 6                        H  10 9 3
    D  10 9 6                         D  J 8 7 4 3
    C  K 9 5                          C  7 6 2
    (Hand No. 2)                      (Hand No. 4)

S  A Q J 4 2
                    H  7   5 4
                    D  K
                    C  A 8 4 3
    DEALER          (Hand No. 1)
```

Along each of the four side edges of the card are preferably placed two rows 49 and 50 of the thirteen card indications for the hand of a bridge deal. These indications are shown in duplicate in the drawings.

In the drawings, the "dealer" hand is indicated as "Hand No. 1" and the succeeding hands as "Hand No. 2", "Hand No. 3", and "Hand No. 4". The showing may be abbreviated to "D", "2", "3", "4".

Adjacent each of the indications for the cards of each hand the medium carries the suit indicators for the four suits, these being indicated at 51 and placed at the right of the hand to which they relate. They are preferably in the order indicated so as to alternate the red suits and the black suits. Aligned with each of these suit indicators are indications showing the order in which suit cards and/or discards should be played on tricks in which the corresponding suit is led.

The card also carries opposite each hand a series of lead indications opposite the word "Lead" and employing the letters "D", "S", "C" or "H" to indicate the suit to be led. Adjacent each of the lead indications for the four hands is a series of numbers consecutively arranged and utilized to total the number of leads made (other than the first lead of a predetermined hand of the deal).

Near the center of the card appear the bid indications. These consist of selected numerals opposite the legends "C", "D", "H", "S" or "N. T.", which together may be utilized to indicate the number of tricks (and suit or "no trump") con-tracted for. The bid indications also include "pass" indications. The five possible non-passing bids have, for purposes of the present device, been assigned the following numerical distinctions:

| | |
|---|---|
| Clubs | 1 |
| Diamonds | 2 |
| Hearts | 3 |
| Spades | 4 |
| No trumps | 5 |

These distinctions or values must be borne in mind by the manual bidder, as they are employed as a basis in the design of the bidding features. While they are arbitrary, they in no way interfere with the established rules of contract bridge relating to the values of bidding.

Inside these bid indications the card carries a series of numerals which appear opposite each of the hands. These numerals are arbitrarily chosen and are based upon the numerical distinctions referred to. Whatever bid is offered, one should add the numerical distinction to the number of tricks bid. For example, for a bid of "one club" one mentally adds "1" for clubs, "1" for number of tricks bid, and arrives at the total "2"; for a bid of three spades, one adds "4" for spades and "3" for the number of tricks bid and arrives at the total "7". In the particular card shown, these numerals happen to be 1 to 10 inclusive. Not over ten numbers need appear in connection with the bid of a hand, even though the hand warrants bids corresponding to number 11 or 12, for in such hands certain numbers, not being necessary, are omitted.

In addition to the card indications, lead, play and response indications, and the bidding indications above referred to, the card 46 may be provided with information and instructions regarding bid and play of the various hands appearing on the card, and may be provided with suitable data indicating an assumed preceding score, vulnerability and the like; also information directing the turning over of the card when it is possible to arrive at bids in different suits. In place of general information concerning bid and play, actual lessons as to how to bid or play may be offered.

The plate 47 is preferably made out of heavy gauge sheet metal so as to be stiff and strong. It is skeletonized by punching holes in it to permit observation of pertinent data on the medium carrying the card indications and the like.

Along each edge of the plate 47 is a cut-back or notch 52 of sufficient width and depth to reveal the row of card indications 49 adjacent the edge of the sheet 46. The cover member is provided with elongated apertures 53 opposite the inner row of card indications 50.

Above the strips of material 54 which separate the cut-outs 52 and slots 53 are shafts 55. These shafts are anchored at suitable intervals to the plate 47 by a strip 56, and each shaft 55 supports movable devices for concealing or revealing the corresponding card indications. The devices found on the front and rear shafts 55 are shown in detail in Fig. 3, where it will be seen that each set of devices includes thirteen pairs of cover members 57a, 57b. When the cover members are both down, as indicated at the left of Fig. 3, both rows of card indications will be concealed. Either of the members 57a or 57b may be swung over onto the other member so as to reveal the card indication previously covered.

In the form of card indication revealing device employed on the closed hands, one row of covering devices is indicated at 57c (Figs. 1 and 2). These are arranged to rest on the card indications or to be swung up into the dotted position of Fig. 2 so as to reveal the card indication, if desired. In this position, they rest on shields 58 placed above the openings 52. These shields make it impossible for a player opposite the control hand, or hand numbered 1 (in the lower right hand corner of Fig. 4), to see the card indications in the closed hands, but permit others to observe the card indications. Instead of shifting the cover members 57a and 57c one at a time, all those in a row may be thrown up by a wire member 57d underlying the cover members and pivoted on the shaft 55. A thumb-piece 57f is provided for operating the shifter.

In the drawings, the cover plate 47 is provided with holes indicated at 59 to permit observation of the suit indicators 51 appearing on the card 46. If desired, these suit indications may be placed on the plate 47 instead of on the card.

Alongside each of the four suit indication openings 59, the plate 47 is provided with elongated apertures, these being indicated at 60, 61, 62 and 63 for each hand. These elongated apertures are placed so as to be above the corresponding rows of play indications carried by the card 46. Each of the openings 60 to 63 inclusive is normally covered by a row of hinged flippers 64, there being thirteen flippers in each of the four rows. These flippers overlap one another, as indicated in the drawings, and when all the flippers are in the position shown in Fig. 1, the slots are closed so that observation of the play indications cannot be made.

The cover plate 47 is also provided with a row of flippers 65 adapted to cover the slot 65' over the lead indications on the card 46. The plate has slots 65'' opposite the machine played hands to expose the trick-counting numerals.

The plate 47 is also provided with four arcuate slots 66 separated by bridging members 67 which support a center 68. The slots 66 are placed so as to permit observation of all the bid indications and numeral indications carried about the center of the card 46. To control the observation of these numerals and bid indications, the plate 47 supports a movable disc 70 slightly larger in diameter than the outer edge of the opening 66. This disc is adapted to have a limited angular movement by the pin and slot arrangement shown at 71 and 72. The disc has an aperture 73 at the radius of the numerals which makes it possible to adjust the position of the disc to disclose any one, and only one, of the set of numerals that faces the hand without play flippers. The disc is provided with three openings or slots 74, 75 and 76 at the proper radius, each adapted to permit observation of only bid indications for each hand at a time. Each of these openings is ordinarily closed by a movable flipper or cover member 77.

The plate 47 is provided near the lower right hand corner with two apertures such as indicated at 78 and 79. These apertures are adapted to permit the reading of the information provided on the card, an example of which appears in the drawings. The aperture 79 is normally closed by a cover 79' which may be opened after the bidding to ascertain whether the card is to be turned over for the play. It may also have four holes marked 80 to allow observation of the legends "D", "2", "3", "4" when the cards are so provided.

If it is assumed that the card indicated in Fig. 4 is to be placed in the device with the dealer hand, or hand No. 1, in the manually playing position at the front of the machine, the subjoined description will disclose the operation of bid and play of the deal.

Figure 5:
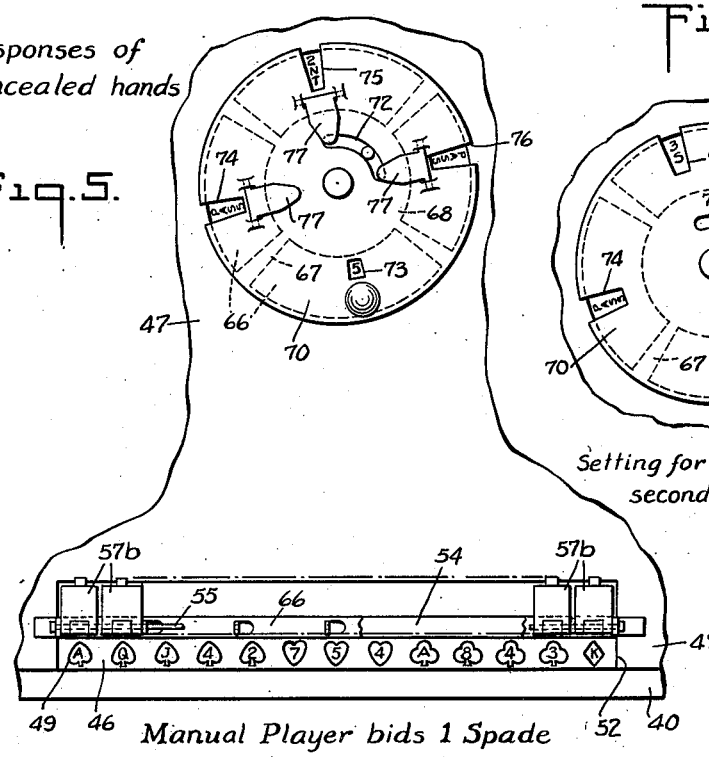
Fig. 5 is a fragmentary view illustrating the setting of the bid device for a manual bid of one spade by the disclosed hand and showing the responses of the concealed hands.
Figure 6:
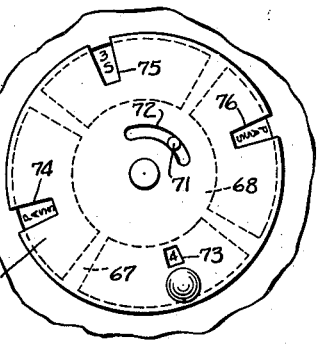
Fig. 6 is a diagrammatic view illustrating the setting of the bid device to correspond with the secondary bid of three clubs by the manual player.

When the card is thus inserted, all that the manual player sees is the row of card indications for his hand, as shown at the bottom of Fig. 1. As he is the dealer in the particular hand shown, the most likely opening bid is "one spade". To ascertain the responses of the concealed hands, the player moves the plate 70 to bring the opening 73 opposite the numeral 5, this being the sum of "4" for spades and "1" for the number of tricks. To ascertain the responses of the concealed hands, the flippers 77 are turned back, as indicated in Fig. 5, when it is seen that hand No. 2 passes, hand No. 3 bids "2 no trump", and hand No. 4 "passes." Then the flippers are moved to cover the openings and the device is ready for the manual player's response. After a bid of "2 no trump" from the partner of the manual player, the most likely response of the manual player is a secondary bid of three clubs. If this bid is desired, the manual player moves the plate 70 to bring the opening 73 opposite the numeral "4". The numeral 4 corresponds with "3" for tricks contracted for plus "1", the numerical distinction for clubs. The flippers are again moved to uncover the openings (as shown in Fig. 6) and it is seen that hand No. 2 "passes", hand No. 3 bids "3 spades" and hand No. 4 "passes".

Figure 7:
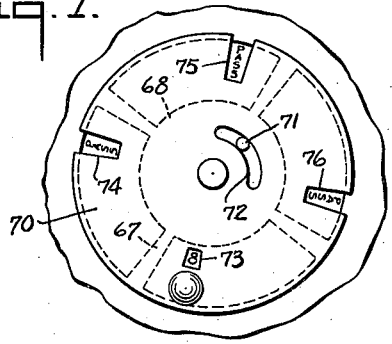
Fig. 7 is a diagrammatic view illustrating the response of the manual player by a game bid of four spades.

The response of the manual player to the partner's bid of "3 spades" is "4 spades", and the bidding disc 70 is then moved to bring the numeral 8 opposite the opening 73, and in the manner previously described, the responses of the other three hands can be ascertained. As indicated in Fig. 7, it is "pass-pass-pass". The hand is then ready for playing, with the card in the position which has been described. If a different opening bid or response is made by the manual player or players, a different contract may be arrived at.

In the example given, the numbers in the bid circle run consecutively in each set. Any particular number is in the same relative position for all four hands. This is not essential, as it frequently is of advantage not to have the numbers run consecutively.

The response of a manual player having hand No. 3 to an opening "pass" by the dealer might well be "one diamond". To ascertain the response of hand No. 4, the bid device is moved to the position of Fig. 8, where the number 3 appears ("1" for number of diamond tricks bid and "2" for diamonds). The bid device indicates a "pass" in hand No. 4.

Figure 9:
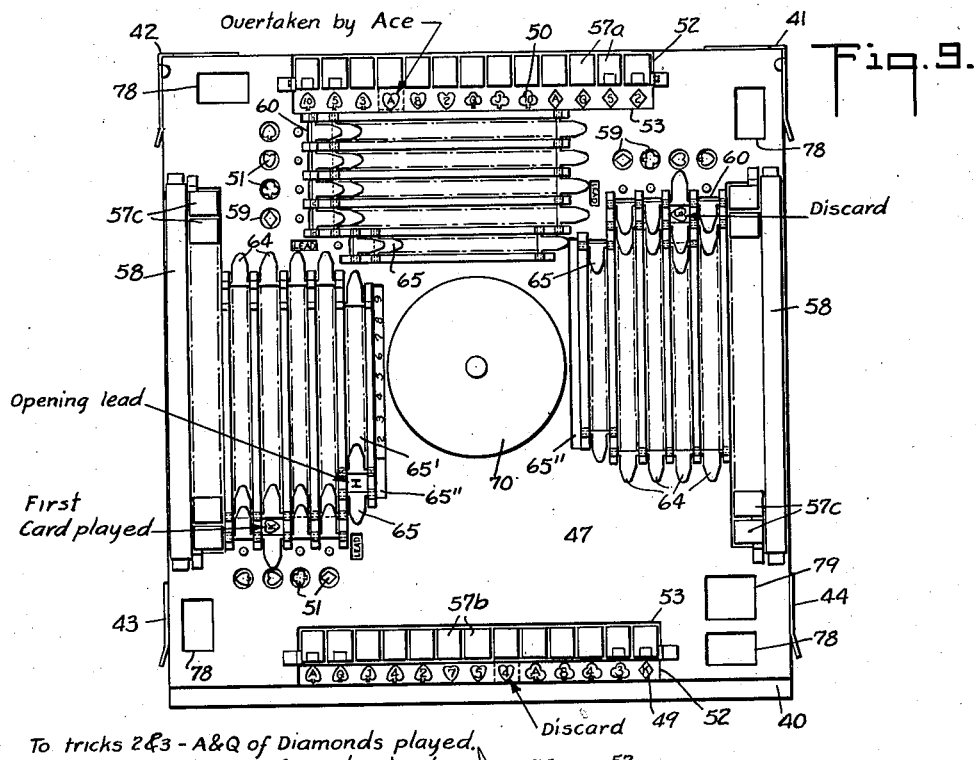
Fig. 9 is a view similar to Fig. 1 illustrating the revealing of the dummy hand, and the opening lead in hearts and the play of the first trick.

In the arrangement shown in Figs. 1 to 7 inclusive, the manual player is declarer at a contract of "4 spades". As shown in Fig. 9, he then lifts the first lead indication flipper 65 (for hand No. 2) and sees the letter "H", which indicates that the opening lead is a heart. He then turns the first flipper in the heart row, revealing the opening lead of the king of hearts. He then swings back the thirteen individual covering means 57a which conceal the dummy hand. The manual player has control of the plays of declarer's hand and dummy, and may play these hands as he sees fit. There is a proper way to play the hand to make the contract. This is shown by the machine, and for convenience of discussion this play will be followed, as though the player were an expert, rather than explain ways of not making the contract.

The opening lead being in hand No. 2, the first (unnumbered) lead flipper is raised, revealing the letter "H", as shown in Fig. 9. The first heart lead indication is the king of hearts. The dummy is then revealed, and the first play in dummy, as shown in Fig. 9, is to overtake the king by playing the ace of hearts. This is shown by the dotted position of the corresponding cover member. Opening the first flipper in the heart row on hand No. 4 (at the right) shows that the play there is the three of hearts. The manual player then plays the four of hearts, as indicated. This trick was taken in the dummy hand, and hence the next lead is from the dummy.

Figure 10:
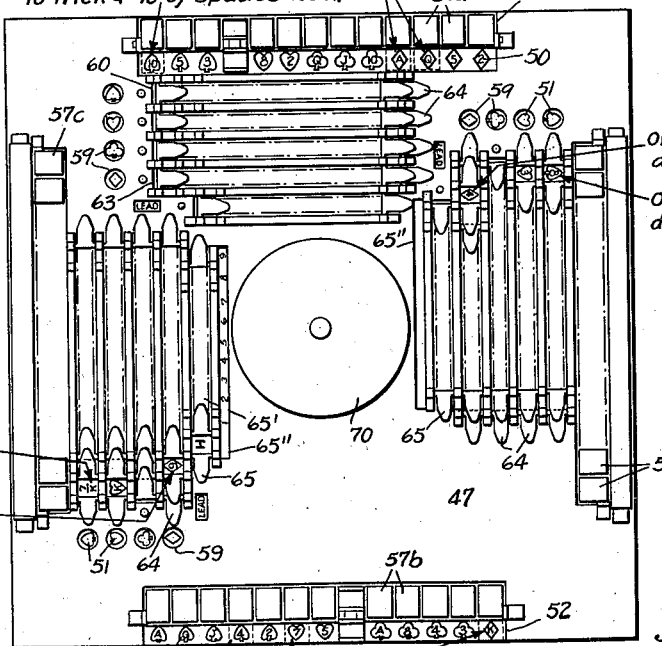
Fig. 10 is a view similar to Fig. 9 illustrating the lead and play of tricks 2, 3 and 4.

Referring to Fig. 10, it is seen that the lead for the second trick is stated to be the ace of diamonds, and the play on the second trick is stated as the three of diamonds, king of diamonds and six of diamonds. Dummy takes the trick and the most probable lead from the dummy hand for the third trick is the queen of diamonds, as stated in Fig. 10. The rest of the trick includes the four of diamonds, the seven of hearts and the nine of diamonds.

For the fourth trick, dummy again leads, this time the ten of spades, as stated in Fig. 10. The lifting of the first spade flipper for hand No. 4 reveals the play of a small spade, as indicated in the drawings, and then the manual player offers the four of spades for a finesse. The first spade flipper for hand No. 2 shows $$\frac{7}{K}$$

indicating that this hand may take the trick with the king, or allow dummy to take the trick with the ten of spades.

Assuming that the king in hand No. 2 takes the trick, the lead is in hand No. 2. The suit to be led after this trick is found by raising the flipper opposite the numeral 1, and, as shown in Fig. 11, one sees the letter "H" indicating that a heart is to be led. The queen of hearts is led, taking the 8, 9 and 5, as indicated.

Trick 5 having been taken by hand No. 2, the next lead flipper for hand No. 2 is lifted, indicating a heart lead for trick No. 6. The next heart to appear in the play indications for hearts in hand No. 2 is the jack. This lead is followed by the 2 and 10 of hearts, and the manual player plays the two of trumps.

Fig. 12 shows that the manual player leads the ace of spades for trick 7. In hand No. 2 the indication $$\frac{K}{7}$$

appears in the second space for a spade lead. As the king was played on the finesse play of the first spade trick, the 7 is played. The 5 and 9 of spades are played, and the next lead from hand No. 1 is a spade honor, the jack or queen. This strips the opponents' hands of trumps, the 7 of diamonds being indicated as the discard for hand No. 4 for the third spade lead.

The lead shown for trick 9 is the 3 of clubs from hand No. 1. The trick is taken by the king of clubs in hand No. 2, as shown in Fig. 12. (The first club flipper shows $$\frac{K}{5,}$$

indicating that the 5 would be played had the ace been led.) The 10 and 2 of clubs are then played in hands 3 and 4.

Lead flipper No. 4 of hand No. 2 shows the lead for trick 10 to be $$\frac{H}{C}$$

indicating that a heart or club might be led. The top letter is the preferred lead, but should there be no card of that suit available, the other suit should be led. In some cases it is necessary to show three possible suits to lead. The manipulation of the flippers in the sequence directed will be carried out for tricks 10, 11, 12 and 13. Declarer takes the remaining tricks, making the contract of 4 spades. At the end of this play, one can determine the number of tricks taken by the opposing hands by adding the numbers opposite the open spaces in the lead indications.

Any time either non-manual hand takes a trick, it is necessary to turn one of the lead flippers to ascertain the next lead. If one will total the numbers of leads of these two non-manual hands (the numbers are directly under the open lead spaces) it will at any time give the number of tricks taken against the manual player, provided the flipper for the next lead is turned before making the count. This turn of the flipper should be made even after the last trick, if the machine takes it. The card has a row of numbers opposite each hand, but only two such rows appear through the slots 65''.

After the completion of play, all the flippers in a line may be returned to the normal position by taking hold of the bottom flipper and swinging it toward closed position. Such action will swing all the other flippers toward closed position.

Examination of the play indications in the card shown in Fig. 4 will indicate a number of discards. These discards must be remembered while the play is progressing and the extra discards shown will take care of alternate ways in which the hands may be played. By way of example, reference will be made to the discards in hand No. 2 having 4-3-3-3 distribution. This hand will normally discard the 6 of hearts at the first opportunity. This may be after the fourth lead of any suit. In Fig. 4 the 6 of hearts appears as a discard for diamond and spade leads. If used on a diamond lead, it cannot be used on a later spade lead, and when an unavailable discard appears among the play indications, it is necessary to operate the next flipper to find the next available discard. In the case being discussed, this will be a diamond. The discards in hands 3 and 4 are arrived at in the same way.

The appearance of a double indication for a response (such as $\frac{7}{K}$, $\frac{K}{5}$ above referred to), shows the existence of a finesse or the possibility of alternate play. The information brought about by the exposure of this indication is so rarely of consequence that it may be disregarded.

The manual player might have played the dummy hand differently, but no matter how he would have played it, the proper responses in the defending hands would have been made by operating the machine. Should he have erred by failing to take the first trick in dummy, the contract would have been lost. The deal could be replayed by having the machine show the proper play of the dummy hand so as to indicate where the error occurred. Opening the first diamond flipper would have revealed the ace so that the first diamond trick would have been taken by the dummy hand.

Should the player not make the contract and wish to find out how the hand should have been played, the card can be placed so that the contracting hands are both played by the machine. The lead and play indications opposite hand No. 1 of Fig. 4 will then appear through the openings in the cover plate. The machine will respond to the manual plays of one or two manual players, playing as partners.

The card may be placed in the machine with any one of the four hands exposed in the control position for manual bid and play so that each card affords the possibilities for individual bid and play of each hand. This greatly enhances the uses to which the machine may be put.

When two persons are playing as partners, the bid flipper for the hand opposite the control position is not opened. This player sees his hand and orally makes the bid which seems best in view of preceding bids. If, after lifting the bid flipper of the next hand, that bid is insufficient, the bid circle is moved one space at a time until sufficient bid, or pass, is reached.

Figure 8:
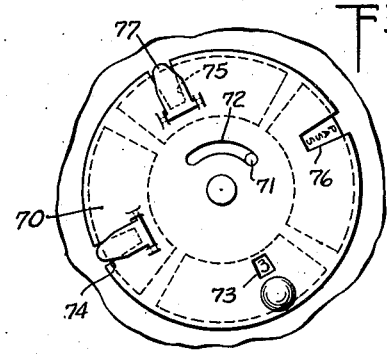
Fig. 8 is a diagrammatic view showing the setting of the bid device in the event of an initial pass by the manual player, followed by a bid of "1 diamond" by the opposite manual player.

In the hand shown in Fig. 4, the dealer might pass the opening bid. This contingency is provided for by placing certain bid indications in positions to be revealed when the bid device is set at numeral 1. This numeral is lower than the setting for any possible bid. This setting is shown in Fig. 8. In the example shown, hand No. 2 "passes", hand No. 3 bids "1 no trump" and hand No. 4 "passes". The manual player after his partner's bid of "1 no trump" might or might not bid "3 spades". If "3 spades" are bid, hand No. 2 "passes", hand No. 3 raises to "3 no trump" and hands Nos. 4, 1 and 2 "pass". If desired, the contract can then remain at "3 no trump" in hand No. 3.

Opening the cover 79' reveals the information that the upper side of the medium 46 has lead and play indications for playing "spade" bids, and that the reverse side of the medium has the indications for playing in "no trump" bids. The card 46 is then removed and replaced in the device the other side up and with hand No. 1 in control position. The leads and plays will be made by the machine for hands 2 and 4 and by the manual player for hands 1 and 3. Had the card been in the machine with the dealer hand in any other position, and a "no trump" contract arrived at, the card would be turned over and replaced with the dealer hand in the same position it had during the bidding.

The two sides of the card will be printed the same so far as the hands and bids are concerned. The lead indications will be changed to accord with the "no trump" contract, and the play indications changed accordingly.

Where the hands are such that the bids might be in two different suits, the opposite sides of the card will be printed to give information for the alternate play.

Should the card of Fig. 4 be placed in the machine, as shown in Fig. 13, hand No. 2 in the control position, the dealer hand is concealed at the right and must be bid by the machine. To ascertain the opening bid, the bid device is moved to reveal numeral 1, and the proper flipper raised, showing the opening bid is "1 spade". The manual bidder with the hand shown in Fig. 13 will "pass". The value of a "1 spade" bid is "5", and to ascertain the responses of the machine to the "pass" in hand No. 2, the bid device is, as indicated in Fig. 14, moved to reveal the numeral 5. The response is indicated at "2 no trump", "pass", "4 spades".

Thus it appears that each time a bid made by the manual player, or by the machine, is followed by a manual bid, or "pass", the bid device is set to the number corresponding to the value of the preceding contract bid, and thereupon the response of the machine is ascertained.

The system of bid indications is such that, in most all instances, the machine gives a responsive bid wherever one is intended. At times, however, it is possible for a manual player to have made a bid which calls for a setting of the bid device in a position where an insufficient bid appears somewhere in the responses of the concealed hands. To arrive at the proper response, the bid device is advanced one step at a time until a responsive bid, or "pass", appears.

Fig. 15 illustrates the bid information on a card having the following deal, and the dealer in control position:

```
                    S 8 4 3
                    H 8 6
                    D A K Q 7 6
                    C 7 5 4
                    (Hand No. 3)

S K 10 9                            S Q J 6 2
  H 9 7 2                             H Q J 10 5
  D 3 4                               D J 10 9 8
  C J 10 9 8 3                        C K
  (Hand No. 2)                        (Hand No. 4)

S A 7 5
                    H A K 4 3
                    D 5 2
                    C A Q 6 2
  DEALER            (Hand No. 1)
```

A manual player with hand No. 1 has a wide choice of possible bids in response to diamond responses of the concealed hand. He might open with a bid of "1 club" and the machine would respond with a bid of "1 diamond". He might then bid "1 heart" and the machine respond with a bid of "2 diamonds". On a shift to "2 spades", the setting at numeral 6 gives an insufficient response of "2 diamonds". Shift one step clockwise shows the response to be "3 diamonds".

*Figures 16 to 32*

The form of device illustrated in Figs. 16–32 inclusive is designed in general for the same purposes as previously described in detail. This form of device has a rectangular base 100 similar to the base 40 and it carries upwardly extending rear corner angles 101 and 102 and side guides 103 and 104. These guides and corner pieces carry inwardly extending members 105 and 106 projecting over the cards and cover member. The cards 107 and cover member 108 are adapted to be slidably received from the front of the machine.

A typical card, or indicia-carrying medium, is shown in detail in Fig. 18, arranged to play the same hand which was employed in the card of Fig. 4. It contains indications similar in function and purpose to those appearing in Fig. 4. Along the four side edges of the card 108 are preferably placed two rows 109 and 110 of the thirteen indications for the cards of the hand of the bridge deal to be bid and played. Adjacent each of the indications for the cards of each bridge hand the medium 108 carries arcuately disposed indications, indicated generally by the reference character 111, showing the order in which cards should be played on tricks. These play indications are disposed concentrically about the center of the card.

The medium also carries adjacent each hand a series of lead indications, indicated generally by the reference character 112, these being placed to the right of the hand when the hand is viewed from the adjacent edge of the sheet. These lead indications show the symbol of the suit to be led. A number appears adjacent each of the suit symbols except sometimes the one for the initial lead, where the trick is not to be taken by that particular hand. These numbers are utilized to show the number of tricks taken in that hand.

The card or medium 107 also carries near the center a series of bid indications the same as those shown and described in connection with the card or medium of Fig. 4. The card or medium may have printed indications analogous to those shown in Fig. 4.

The cover plate 108 is here shown as made out of transparent material. Celluloid or similar non-frangible, transparent material may be employed. By employing the transparent cover plate, it is possible to see all the indications appearing on the card except those which are hidden by opaque elements carried on the upper face of the cover member.

The transparent cover plate 108 carries a series of movable devices for concealing or revealing the corresponding card indications. These devices are arranged in pairs as indicated at 112a and 112b. Thirteen pairs of these devices are arranged along each edge of the cover plate 107, these devices being pivoted on shafts 113 secured in brackets 114. A coiled spring 115 is disposed underneath the shaft 113 and between two guide strips 116 and 117. This spring enters notches 118 and 119 in the members 112a and 112b, as will be obvious from Fig. 19, and acts to hold the devices 112a, 112b in raised or lowered position. Any or all of the devices 112a may be turned up to reveal the corresponding card indication in the outer row and any or all of the devices 112b may be turned up to reveal the corresponding card indications in the inner row. Both devices of a pair, however, cannot readily be turned up at the same time.

The cover plate 108 is provided with five concentric guide rings 120, 121, 122, 123 and 124. The cross-section of these rings is indicated in Fig. 17. They form four annular channels adapted to receive arcuate segments and to allow the movement of these segments in arcuate paths. Reference to the drawing of Fig. 16 will show that each arcuate space accommodates two segments of slightly less than 180° angular extent. The space between the outer pair of rings is designed for the "spades" segments 125, 126, the next inner space for the "hearts" segments 127, 128, the next inner space for the "diamonds" segments 129, 130, and the innermost arcuate space for the "clubs" segments 131, 132.

The outer guide ring 120 and the rings 121, 122, 123 and 124 carry stops indicated at 133 engageable by stop members 134 carried by the adjacent movable annular segments so that the segments when turned counter-clockwise will be brought to a definite stop position, as shown in Fig. 16. Between each pair of segments are two spaces or gaps 135. These spaces allow one to move a segment a predetermined angular amount to widen one gap before the other gap is closed up. The rings 121, 122, 123 and 124 carry springs 136 extending outwardly and bearing on the adjacent segments. The springs have bumps 137 adapted to enter regularly spaced spots 138 in the segments which indicate where the segment is to be brought to rest for each step in its movement.

The segments 126, 128, 130 and 132 are notched as indicated at 139, Figs. 16 and 21, so as to provide openings spaced 90° from the gaps 135.

The bid devices for the form of construction shown in Fig. 16 include an opaque disc 140 rotatable about a center support 141. This disc extends out to the inner face of the ring 124. It is provided with four windows 142, 143, 144 and 145 arranged at 90° to one another and similar to the windows or openings 73, 74, 75 and 76 of Fig. 1. The window 142 is open at all times while shutters 146, 147 and 148 are provided for the windows 143, 144 and 145. Stops 149 and 150 limit the counter-clockwise movement of the disc 140. The disc is provided with indentations 151 engageable by a spring 152, and the disc is movable in steps in the direction of the arrow so as to reveal the bid indications in the same way that they are revealed in the structure shown in Fig. 1.

The cover plate 108 also carries four lead revealing devices 160, 161, 162 and 163 pivotally supported as indicated at 164 in Fig. 2. These discs are notched as indicated in the drawings and are provided with indented stops 165 to receive bumps carried on springs 166. When the discs 160 to 163 are in normal position, they are turned counter-clockwise against stops indicated at 167 and conceal the lead indications appearing on the card of medium 107.

When the card or medium is inserted in the machine to commence bid and play, the device appears as illustrated in Fig. 16, the manual player turns up the members 112a on hand No. 1 and ascertains the cards of that hand. He has no knowledge as to what the other hands contain. The bidding is carried out in identically the same way as described in detail, in connection with the structure of Figs. 1–15, the contract being four spades in hand No. 1.

As the manual player will be assumed to be playing the dummy hand without reference to the machine, the machine indications for playing the dummy hand will be concealed by means of a plate 168 shown in Fig. 23. This plate is placed on the machine, as shown in Figs. 24–31 inclusive. The plate is held in position by small pins 169 carried by rings 120 and 124 and entering holes 170 in the plate.

Hand No. 2 having the initial lead, the manual player then operates lead indicator 160 one step and reveals, as shown in Fig. 24, that the opening lead is a "heart". To ascertain the first card to be played, the adjacent "hearts" segment 128 is shifted one space, as indicated in Fig. 24, showing that the first card to be played is the king of hearts. The movement of the heart segment 128 has closed the gap on the upper right-hand side of the machine between that segment and the other heart segment 127, as shown in Fig. 24. The player then lifts or raises the members 112b opposite the dummy hand so as to reveal the dummy. His next play is the ace of hearts, which is indicated by the dotted lines shown in Fig. 25.

To ascertain the discard of hand No. 4, the "hearts" segment 127 is moved one step, revealing the three of hearts. In hand No. 1 the four of hearts is discarded, as shown in Fig. 25. The next lead is from the dummy, and, as shown in Fig. 26, the ace of diamonds is led. Shifting the diamond segments 129 reveals the three of diamonds as the play in hand No. 4. The king of diamonds is played in hand No. 1 and the six of diamonds appear as the play in hand No. 2. For the third trick, as shown in Fig. 27, the queen of diamonds is led from the dummy and the segment 129 shifted another space revealing the four of diamonds as the play for hand No. 4. The seven of hearts is discarded from hand No. 1 and the nine of diamonds played from hand No. 2.

The lead for the fourth trick, as shown in Fig. 28, is the ten of spades. On movement of the spade segment 125, the eight of spades appears as the play for hand No. 4. Hand No. 1 plays the four of spades for a finesse, and the numerals $$\frac{5}{6}$$

appear in the gap at the left between segments 125 and 126.

The significance of these numbers $$\frac{5}{(6)}$$

will now be explained. The card is provided with numbers opposite the card-revealing and concealing devices 112b. These numbers appear in the drawings and are to be read from the center toward the outside of the figure. Opposite the four of spades in hand No. 1 appears the small figure "6". When this figure appears in the gap, as above mentioned, the player is to uncover the device concealing the card indication opposite the small figure "6" in the succeeding hand. On doing this, the player finds that the king of spades is the play to be made on trick No. 4. The king would have been the proper play no matter which of the spade leads was made other than the ace. Had the ace been played as the first spade lead, the player would have lifted the device opposite numeral 5 in hand No. 2, finding that the play was the seven of spades.

The lead is again in hand No. 2 and the play for tricks 5 and 6 is illustrated in Fig. 29. To ascertain the lead, the operator moves the lead indicating device 160 one notch revealing the numeral "1" and the heart symbol. The "hearts" segment directs that the queen of hearts is to be led, and this takes the trick. The next move of the indicator 160 shows another lead in hearts, the movement of the "hearts" segment directing that the jack should be led. These leads and plays are found by successively moving the segments so as to reveal the play of the various tricks.

Trick 6 having been trumped with the two of spades, the lead is again in hand No. 1, and as shown in Fig. 30, tricks 7 and 8 are taken by trumps in hand No. 1, and the three of clubs led for the ninth trick. The three of clubs is opposite a small figure "4", and this shows that the proper cards for the play on the trick are opposite small numbers "4" in the other hands.

The first move of the "clubs" segment shows $$\frac{4}{7}$$

and as the lead was from a card opposite the small numeral "4", one finds that by lifting the device 112b in hand No. 2 opposite the small figure "4", that the king of clubs is the desired play.

The play for the succeeding four tricks is indicated in Fig. 31, the play being carried out by successively moving the lead indicators and the segments to show what play is to be made. Whenever the play is made from opposite the small numbers, the desired play and discards in the other hands are to be found, as above explained, by lifting up the covering devices 112b. These show alternative plays and discards, the discards being marked on the numerals such as "1x", "2x" and "3x", and the card of Fig. 18 shows "x's" for the discards instead of showing an indication of the actual card to be discarded, as was done in the card shown in Fig. 4.

Should the manual player desire to have the dummy or hand No. 3 played by the machine, the cover plate 168 will not be placed in position. The plays from the dummy hand will then appear in the gaps 138 as the segments are moved along the path. Certain of these plays are indicated in dotted lines in Figs. 24–28. They are omitted from Figs. 29–31, as the dotted lines would become too confusing.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. In a bridge playing device adapted for the manual play of four bridge hands by one person, a medium bearing indications of the cards of a bridge deal and playing indications for the non-manually played hands, showing the order in which cards are to be played from said non-manual hands, means movable into positions for separately concealing or revealing each of the card indications of two hands, whereby the manually playable hand may be seen by the manual player and the dummy hand exposed, movable members for revealing in proper sequence the cards to be played for each move, play or response from the concealed hands for each successive trick, the notations of play in each of the revealed hands being made by the means which conceals or reveals the card indications of the revealed hands, and means to support said movable means and said movable members in substantially fixed relation and registry with the indications on the medium.

2. A bridge playing device such as claimed in claim 1, wherein the indications of the cards of the revealed hands are disposed in duplicate rows adjacent the edges of the medium, and each card revealing means for the manually playable hand can be positioned to disclose but one indication of each card only, the other indication being concealed.

3. A bridge playing device such as claimed in claim 25, wherein the indications of the hands are disposed in duplicate rows adjacent the edges of the medium, and the supporting means carries shields each of which restricts observation of the non-manual hands by the player.

4. A bridge playing device such as claimed in claim 1, wherein the card indications of each hand are in a straight row and the concealing and revealing means for each card indication of a hand is pivoted on an axis parallel with the row of card indications.

5. A bridge playing device such as claimed in claim 1, wherein the hands are disposed along the four sides of a rectangular area, the card indications of each hand are in a straight row, and all the concealing and revealing means for the card indication of each hand are movable in a direction transversely of the row of card indications.

6. A bridge playing device such as claimed in claim 1, wherein the playing indications are arranged in rows, one for each suit and opposite the corresponding hand, and the corresponding movable members are disposed to disclose only one indication at a time in each row and to thereafter conceal it.

7. A bridge playing device such as claimed in claim 1, wherein the suit lead indications are independent of the play indications and the corresponding movable members for the lead indications remain in the positions to which they have been moved to effect a revealing of the lead to thereby provide an indication of the number of tricks taken by each of the non-manual hands except the last trick played.

8. A bridge playing device such as claimed in claim 1, wherein the hands are disposed along the four sides of a rectangular area, and the playing indications are arranged in rows, one for each suit in the corresponding hand and opposite thereto, and the corresponding movable members are disposed to uncover one unit length of the row at a time in each suit to reveal the indicia thereon and to thereafter cover said area.

9. A bridge playing device such as claimed in claim 1, wherein the indications of the cards of the revealed hands are disposed in duplicate rows adjacent the edges of the medium, and each card revealing means for the manually playable hand can be positioned to disclose but one indication of each card only, the other indication being concealed, and wherein the playing indications are arranged in rows, one for each suit and opposite the corresponding hand, and the corresponding movable members are disposed to uncover one unit of length of the row at a time in each suit to reveal the indicia thereon and to thereafter cover said area.

10. A bridge playing device such as claimed in claim 1, wherein the supporting means comprises an opaque apertured plate through which the indications on the medium may be seen when the movable members and means carried thereby are shifted to uncover the same.

11. A bridge playing device such as claimed in claim 25, wherein the card indications and cooperative revealing and concealing means are similarly arranged about four sides of a square and wherein the lead and play indications and cooperative movable members are similarly arranged with respect to three sides of the square, and the medium also carries lead and play indications for the manual hand similarly disposed thereon to be disclosed in the same manner as the other lead and play indications when the medium is shifted to place this hand in a non-manual playing position.

12. A bridge playing device such as claimed in claim 1, wherein the card indications are in a straight row, and the revealing and concealing means comprise a row of elements separately movable transversely of the row so that any card indication may be covered or uncovered at will.

13. A bridge playing device such as claimed in claim 1, wherein the supporting means is in the form of a sheet of transparent material, and said movable cover members are opaque so as to conceal and reveal said indications when shifted in play.

14. A bridge playing device such as claimed in claim 1, wherein the play indications for each of the suits are disposed about a circle and the circles are concentric, and wherein the movable members for each suit comprise two concentric segments movable along arcuate paths.

15. A bridge playing device such as claimed in claim 1, wherein the play indications for each of the suits are disposed about a circle and the circles are concentric, and wherein the movable members for each suit comprise two concentric segments movable along arcuate paths, the segments occupying less than a circle so as to provide two narrow gaps or one wide and one narrow gap for observation of the play indications.

16. A bridge playing device such as claimed in claim 1, wherein the supporting means is in the form of a sheet of transparent material and the movable members for revealing the play indications of each suit led comprise two arcuate segments oscillatably mounted on the transparent sheet, the segments for the other suits being concentric and the play indications on the medium being arranged concentrically and visible through the gaps between the segments.

17. A bridge playing device such as claimed in claim 1, wherein the supporting means is in the form of a sheet of transparent material provided with circular guides and the movable members for revealing the play indications of each suit led comprise two arcuate segments oscillatably mounted in said guides, the segments for the other suits being concentric and the play indications on the medium being arranged concentrically and visible through the gaps between the segments.

18. In a bridge playing device, a medium bearing thereon a row of card indications for the play of cards from a bridge hand in accordance with the cards led to the hand, a superposed plate, and a plurality of opaque flippers pivoted at their edges to the upper face of the plate, each normally covering one of the card indications and movable to reveal the same, the free edge of each flipper overlapping the hinged edge of the adjacent flipper so that the flippers in each row must be moved in sequence to disclose the play indications of said row.

19. In a bridge playing device, a sheet metal plate having an elongated aperture, and a plurality of flippers arranged in echelon, each pivoted at an edge to the plate, the flippers in one position covering the aperture, the flippers being movable about their hinged edges one at a time and in sequence to uncover a portion only of the aperture, said portion being covered when the next adjacent flipper is moved.

20. In a bridge playing device, a medium bearing duplicate indications of the cards of a hand of bridge arranged in parallel rows and two rows of cover members arranged in pairs and individually pivoted intermediate the rows of indications, the cover members of each pair being of a length to extend over and conceal either or both of the indications of one card.

21. A bridge playing device adapted for the manual bid of one hand and the non-manual bid of the other three hands of a bridge deal, said device having stationary bid indications for each of the non-manually bid hands proper for response to possible preceding bids, means to conceal all the bid indications including a bodily movable plate carrying relatively movable cover members of a size to reveal only one indication at a time in each set of bid indications for any position of the plate, and an indicator to facilitate manually setting the cover to positions corresponding with the value of the bid made by the manually bid hand.

22. A bridge playing device adapted for the manual bid of one hand and the non-manual bid of the other three hands of a bridge deal, said device having stationary bid indications for each of the non-manually bid hands proper for response to possible preceding bids, each set of bid indications being in an arc of less than 90°, a pivoted plate for concealing all the bid indications and carrying relatively movable cover members of a size to reveal only one indication at a time in each set of bid indications for any position of the plate, and an indicator to facilitate manually setting the cover to positions corresponding with the value of the bid made by the manually bid hand.

23. In a bridge playing device adapted for the manual bid of one hand and the non-manual bid of the other three hands of a bridge deal, a medium bearing indications of the cards of a bridge deal, and bid indications for each of the non-manually bid hands responsive to possible preceding bids; a fixed cover plate; cover plate supported means for concealing all the card indications of the hands except the hand to be manually bid; a movable plate carried by the fixed plate and having three relatively fixed openings opposite the bid indications of the other hands, the spacing of the bid indications being such that they come opposite the said openings, closure members for the openings, a series of relatively fixed spaced numerals carried by the medium and representing preselected values corresponding with the bids of the manually bid hand, and an indicator carried by the movable plate and adapted to be placed opposite the numerals, the numerals and the corresponding bid indications being so spaced that when the indicator is opposite a numeral, the openings are opposite the proper response bids of the other three hands and visible when the closure members are opened.

24. A bridge playing device as claimed in claim 23, wherein the numerals are confined to an arc of nearly 90° and the apertures in the movable plate are 90° apart, and wherein the plate is pivoted to move through an angle of nearly 90° whereby each opening is restricted to the exposure of a single set of bid indications.

25. In a bridge playing device adapted for the manual play or defense of four bridge hands by one person or a partnership, a medium bearing indications of the cards of a bridge deal and playing indications for all four hands and showing the order in which cards are to be played from each of said hands when non-manually played, means movable into positions for separately concealing or revealing each of the card indications of each hand, whereby the manually playable hand may be seen by the manual player and any other hand may be exposed as the dummy hand, movable members independent of said movable means for revealing in proper sequence the cards to be played for each move, play or response from the concealed hands for each successive trick, the notations of play in each of the revealed hands being made by the means which conceals or reveals the card indications of the revealed hands, and means to support said movable means and said movable members in relatively fixed relation and registry with the indications on the medium, and the medium being symmetrical dimensionally with respect to all hands so that any hand may be placed in the position for manual play.

26. A bridge playing device having a rectangular card holder with upwardly extending card aligning means, a card removably held in a fixed position on the card-holder, the card having on the upper face thereof indications showing the cards of a bridge deal, and lead and play of cards therein, and a cover member removably carried by the card-holder and held thereby in a fixed position, the cover member having individually movable means for concealing and revealing the card indications of each hand, and movable members disposed over the lead and play indications of three of the hands only showing in sequence the lead and play of said three hands.

27. In a bridge playing device for the manual play by one person of one or two of the four hands of a bridge deal, a stationary medium having play and response indicia thereon for the play of the undisclosed hands, a relatively stationary cover for the medium, cover carried means for concealing and revealing in sequence the play and response indicia of the said undisclosed hands, medium carried bid indicia for each of the undisclosed hands located in a predetermined position relative to the play and response indicia of the corresponding hand, and means carried by the cover and movable relatively thereto for concealing and revealing in sequence the bid indicia for each of the said undisclosed hands.

JACK POTTER STOCKTON.